United States Patent
Wang et al.

(10) Patent No.: US 12,231,361 B2
(45) Date of Patent: Feb. 18, 2025

(54) PRECODED SOUNDING REFERENCE SIGNALS FOR PARTIAL RECIPROCITY

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US); Alexandros Manolakos, Escondido, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/758,442

(22) PCT Filed: Feb. 1, 2020

(86) PCT No.: PCT/CN2020/074140
§ 371 (c)(1),
(2) Date: Jul. 6, 2022

(87) PCT Pub. No.: WO2021/151257
PCT Pub. Date: Aug. 5, 2021

(65) Prior Publication Data
US 2023/0006789 A1    Jan. 5, 2023

(51) Int. Cl.
*H04L 5/00*      (2006.01)
*H04L 1/00*      (2006.01)
*H04W 72/54*     (2023.01)

(52) U.S. Cl.
CPC .......... *H04L 5/0048* (2013.01); *H04L 1/0026* (2013.01); *H04L 5/0055* (2013.01); *H04L 5/006* (2013.01); *H04W 72/54* (2023.01)

(58) Field of Classification Search
CPC ... H04L 5/0048; H04L 1/0026; H04L 5/0055; H04L 5/006; H04L 5/005; H04W 72/54; H04W 52/04
See application file for complete search history.

(56) References Cited

U.S. PATENT DOCUMENTS

| 2018/0097595 A1 | 4/2018 | Huang et al. |
| 2018/0287757 A1 | 10/2018 | Onggosanusi |

(Continued)

FOREIGN PATENT DOCUMENTS

| CN | 110168947 A | 8/2019 |
| WO | 2018228478 A1 | 12/2018 |

(Continued)

OTHER PUBLICATIONS

International Search Report and Written Opinion—PCT/CN2020/074140—ISA/EPO—Oct. 28, 2020.
LG Electronics: "Corrections on Non-Codebook-Based UL", 3GPP TSG RAN WG1 Meeting #92bis, R1-1804542, Apr. 20, 2018 (Apr. 20, 2018), 3 pages, sections 1-3.

(Continued)

*Primary Examiner* — Rushil P. Sampat
(74) *Attorney, Agent, or Firm* — Harrity & Harrity, LLP \ Qualcomm

(57) ABSTRACT

Various aspects of the present disclosure generally relate to wireless communication. In some aspects, a user equipment may determine downlink (DL) channel state information; and transmit a first sounding reference signal (SRS) and a second SRS, wherein the second SRS is precoded based at least in part on the DL channel state information. Numerous other aspects are provided.

25 Claims, 10 Drawing Sheets

(56) References Cited

U.S. PATENT DOCUMENTS

| | | | | |
|---|---|---|---|---|
| 2019/0028305 A1* | 1/2019 | Zhang | ................. | H04B 7/0634 |
| 2019/0379502 A1* | 12/2019 | Kakishima | ........... | H04B 7/0619 |
| 2020/0204406 A1* | 6/2020 | Zhang | ................. | H04B 7/0456 |
| 2022/0166587 A1* | 5/2022 | Go | ....................... | H04L 5/0048 |
| 2022/0201696 A1* | 6/2022 | Go | .................... | H04W 72/0446 |
| 2022/0329370 A1* | 10/2022 | Jiang | .................... | H04W 52/04 |

FOREIGN PATENT DOCUMENTS

| | | | |
|---|---|---|---|
| WO | 2019032855 A1 | | 2/2019 |
| WO | 2019192360 A1 | | 10/2019 |
| WO | WO 2021/093138 A1 | * | 5/2021 |

OTHER PUBLICATIONS

LG Electronics: "Text Proposals on UL Beam Management", 3GPP TSG RAN WG1 Meeting AH 1801, R1-1800363, Jan. 26, 2018 (Jan. 26, 2018), 3 pages, sections 1-2.

Qualcomm Incorporated: "Maintenance for Non-Codebook Based UL Transmission", 3GPP TSG RAN WG1 Meeting #92, R1-1802819, Mar. 2, 2018 (Mar. 2, 2018), 4 pages, the whole document.

Qualcomm Incorporated: "Maintenance for Non-Codebook Based UL Transmission", 3GPP TSG RAN WG1 Meeting #92bis, R1-1804784, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, pp. 1-4, XP051427051, sections 1-6.

Supplementary European Search Report—EP20916363—Search Authority—Munich—Sep. 26, 2023.

* cited by examiner

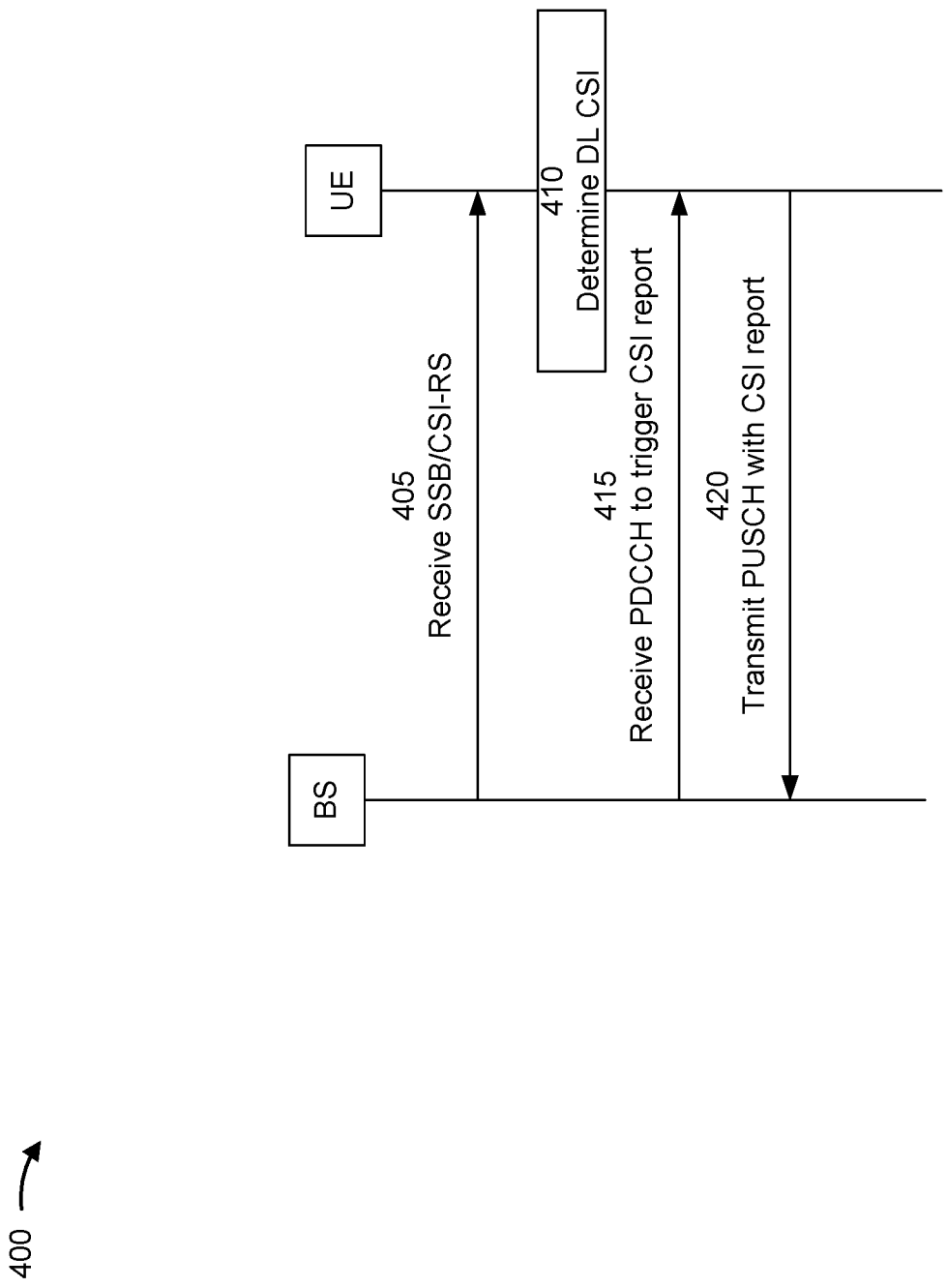

```
600 ─┐

SRS-ResourceSet ::=            SEQUENCE {
srs-ResourceSetID              SRS-ResourceSetId,
srs-ResourceIdList             SEQUENCE (SIZE (1..maxNrofSRS-ResourcePerSet)) OF SRS_ResourceId Optional,  -- Cond Setup
resourceType                   CHOICE {
  aperiodic                      SEQUENCE {
    aperiodicSRS-ResourceTrigger   INTEGER (1..maxNrofSRS-TriggerStates-1)                                 Optional, -- Noncodebook
    csi-RS                         NZP-CSI-RS-ResourceId                                                   Optional, -- Need S
    slotOffset                     INTEGER (1..32)
    ...
    [[
    aperiodicSRS-ResourceTriggerList-v1530  SEQUENCE (SIZE (1..maxNrofSRS-TriggerStates-2))                Optional, -- Need M
                                            OF INTEGER (1..maxNrofSRS-TriggerStates-1)
    ]]
  },
  semi-persistent                SEQUENCE {
    associated CSI-RS              NZP-CSI-RS-ResourceId                                                   Optional, -- Cond Noncodebook
    ...
  },
  periodic                       SEQUENCE {
    associatedCSI-RS               NZP-CSI-RS-ResourceId                                                   Optional, -- Cond Noncodebook
    ...
  },
},
usage                          ENUMERATED (beamMangement, codebook, nonCodebook, antennaSwitching, precoding)
alpha                          Alpha                                                                      Optional, -- Need S
p0                             INTEGER (-202..24)                                                         Optional, -- Cond Setup
pathlossReferenceRS            CHOICE (
  ssb-Index                      SSB-Index,
  csi-RS-Index                   NZP-CSI-RS-ResourceID
}                                                                                                         Optional, -- Need M
srs-PowerControlAdjustmentStates ENUMERATED (sameAsFci2, separateClosedLoop)                               Optional, -- Need S
...
}
```

```
SRS Resource :: -                       SEQUENCE {
  srs-ResourceID                          SRS-ResourceID
  nrofSRS-Ports                           ENUMERATED {port1, ports 2, ports4},
  ptrs-portIndex                          ENUMERATED {n0, n1 }             Optional, -- need R
  transmissionComb                        CHOICE {
    n2                                      SEQUENCE {
      combOffset-n2                           INTEGER (0..1),
      cyclicShift-n2                          INTEGER (0..7),
    },
    n4                                      SEQUENCE {
      combOffset-n4                           INTEGER (0..3),
      cyclicShift-n4                          INTEGER (0..11),
    }
  },
  resourceMapping                         SEQUENCE {
    startPosition                           INTEGER (0..5)
    nrofSymbols                             ENUMERATED (n1, n2, n4)
    repititionFactor                        ENUMERATED (n1, n3, n4)
  },
  freqDomainPosition                      INTEGER (0..67),
  freqDomainShift                         INTEGER (0..268),
  freqHopping                             SEQUENCE {
    c-SRS                                   INTEGER (0..63),
    b-SRS                                   INTEGER (0..3),
    b-hop                                   INTEGER (0..3),
  },
  groupOrSequenceHopping                  ENUMERATED (neiter, groupHopping), Sequecne Hopping),
  resourceType                            CHOICE {
    aperiodic                               SEQUENCE {
      ...
    },
    semi-persistent                         SEQUENCE {
      periodicityAndOffset-sp                 SRS-PeriodicityAndOffset
      ...
    },
    semi-persistent                         SEQUENCE {
      periodicityAndOffset-sp                 SRS-PeriodicityAndOffset
      ...
    }
  },
  sequenceID                              INTEGER (0..1023),
  spatialRelationInfo                     SRS-SpatialRelationInfo
  srsPrecoded                             SEQUENCE {                       Optional, -- need R
    precoding-FormatIndicator               ENUMERATED {wideband, subband}  Optional,
    csi-ReportingBand                       CHOICE {
      subbands3                               BIT STRING (SIZE(3)),
      subbands4                               BIT STRING (SIZE(4)),
      subbands5                               BIT STRING (SIZE(5)),
      subbands6                               BIT STRING (SIZE(6)),
      subbands7                               BIT STRING (SIZE(7)),
      subbands8                               BIT STRING (SIZE(8)),
      subbands9                               BIT STRING (SIZE(9)),
      subbands10                              BIT STRING (SIZE(10)),
      subbands11                              BIT STRING (SIZE(11)),
      subbands12                              BIT STRING (SIZE(12)),
      subbands13                              BIT STRING (SIZE(13)),
      subbands14                              BIT STRING (SIZE(14)),
      subbands15                              BIT STRING (SIZE(15)),
      subbands16                              BIT STRING (SIZE(16)),
      subbands17                              BIT STRING (SIZE(17)),
      subbands18                              BIT STRING (SIZE(18)),
      ...,
      subbands19-v1530                        BIT STRING (SIZE(19)),
    }       OPTIONAL
    codebookConfig                          CodebookConfig                  Optional,
    subbandsire                             ENUMERATED (value1, value2),
  }                                                                         Optional,
  ...
}
```

```
SRS-ResourceSet :: -                    SEQUENCE {
  srs-ResourceSetID                       SRS-ResourceSetId                                                      Optional, Cond
  srs-ResourceIDList                      SEQUENCE (SIZE (1..maxNrofSRS-ResourcePerSet)) OF SRS-ResourceId        NonCodebook
  resourceType                            CHOICE {
  aperiodic                               SEQUENCE {
    aperiodicSRS-ResourceTrigger            INTEGER (1..maxNrofSRS-TriggerStates-1),
    csi-RS                                  NZP-CSI-RS-ResourceID
    slotOffset                              INTEGER (1..32),                                                     Optional, Need -- S
    ...,
    [[
    aperiodicSRS-ResourceTriggerList-v1530    SEQUENCE (SIZE (1..maxNrofSRS-TriggerStates2))
                                                OF INTEGER (1..maxNrofSRS-TriggerStates-1)                       Optional, Need -- M
    ]]
  },
  semi-persistent                         SEQUENCE {
    associatedCSI-RS                        NZP-CSI-RS-ResourceId                                                Optional, Cond NonCodebook
    ...
  },
  periodic                                SEQUENCE {
    associatedCSI-RS                        NZP-CSI-RS-ResourceId                                                Optional, Cond NonCodebook
    ...
  }
  },
  usage                                   ENUMERATED {beamManagement, codebook, nonCodebook, antennaSwitching},
  alpha                                   Alpha                                                                  Optional, Need -- S
  p0                                      INTEGER (-202...24)                                                    Optional, Cond Setup
  pathlossReferenceRS                     CHOICE {
    ssb-Index                               SSB-Index
    csi-RS-Index                            NZP-CSI-RS-Resource ID
  }                                                                                                              Optional, Need -- M
  Srs-PowerControlAdjustmentStates        ENUMERATED {sameAsFci2, separateClosedLoop}                            Optional, Need -- S
  srsPrecoded                             SEQUENCE {
    precoding-FormatIndicator               ENUMERATED {wideband, subband}                                       Optional,
    csi-ReportingBand                       CHOICE {
      subbands3                               BIT STRING (SIZE(3)),
      subbands4                               BIT STRING (SIZE(4)),
      subbands5                               BIT STRING (SIZE(5)),
      subbands6                               BIT STRING (SIZE(6)),
      subbands7                               BIT STRING (SIZE(7)),
      subbands8                               BIT STRING (SIZE(8)),
      subbands9                               BIT STRING (SIZE(9)),
      subbands10                              BIT STRING (SIZE(10)),
      subbands11                              BIT STRING (SIZE(11)),
      subbands12                              BIT STRING (SIZE(12)),
      subbands13                              BIT STRING (SIZE(13)),
      subbands14                              BIT STRING (SIZE(14)),
      subbands15                              BIT STRING (SIZE(15)),
      subbands16                              BIT STRING (SIZE(16)),
      subbands17                              BIT STRING (SIZE(17)),
      subbands18                              BIT STRING (SIZE(18)),
      ...,
      subbands19-v1530                        BIT STRING (SIZE(19)),
    }       OPTIONAL
    codebookConfig                          CodebookConfig                                                       Optional,
    subbandsire                             ENUMERATED (value1, value2),
  }                                                                                                              Optional,
  ...
}
```

FIG. 8

PRECODED SOUNDING REFERENCE SIGNALS FOR PARTIAL RECIPROCITY

CROSS-REFERENCE TO RELATED APPLICATION

This Patent Application claims priority to Patent Cooperation Treaty (PCT) Patent Application No. PCT/CN2020/074140, filed on Feb. 1, 2020, entitled "PRECODED SOUNDING REFERENCE SIGNALS FOR PARTIAL RECIPROCITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for precoding sounding reference signals for partial reciprocity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining DL channel state information (CSI), and transmitting a first sounding reference signal (SRS) and a second SRS, wherein the second SRS is precoded based at least in part on the DL CSI.

In some aspects, a UE for wireless communication may include memory and one or more processors operatively coupled to the memory. The memory and the one or more processors may be configured to determine DL CSI, and transmit a first SRS and a second SRS, wherein the second SRS is precoded based at least in part on the DL CSI.

In some aspects, a non-transitory computer-readable medium may store one or more instructions for wireless communication. The one or more instructions, when executed by one or more processors of a UE, may cause the one or more processors to determine DL CSI, and transmit a first sounding reference signal SRS and a second SRS, wherein the second SRS is precoded based at least in part on the DL CSI.

In some aspects, an apparatus for wireless communication may include means for determining DL CSI, and means for transmitting a first SRS and a second SRS, wherein the second SRS is precoded based at least in part on the DL CSI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its

FIG. 4 is a diagram illustrating an example of transmitting a CSI report.

FIG. 6 is a diagram illustrating an example of radio resource control (RRC) signaling, in accordance with various aspects of the present disclosure.

FIG. 7 is a diagram illustrating an example of RRC signaling, in accordance with various aspects of the present disclosure.

FIG. 8 is a diagram illustrating an example of RRC signaling, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
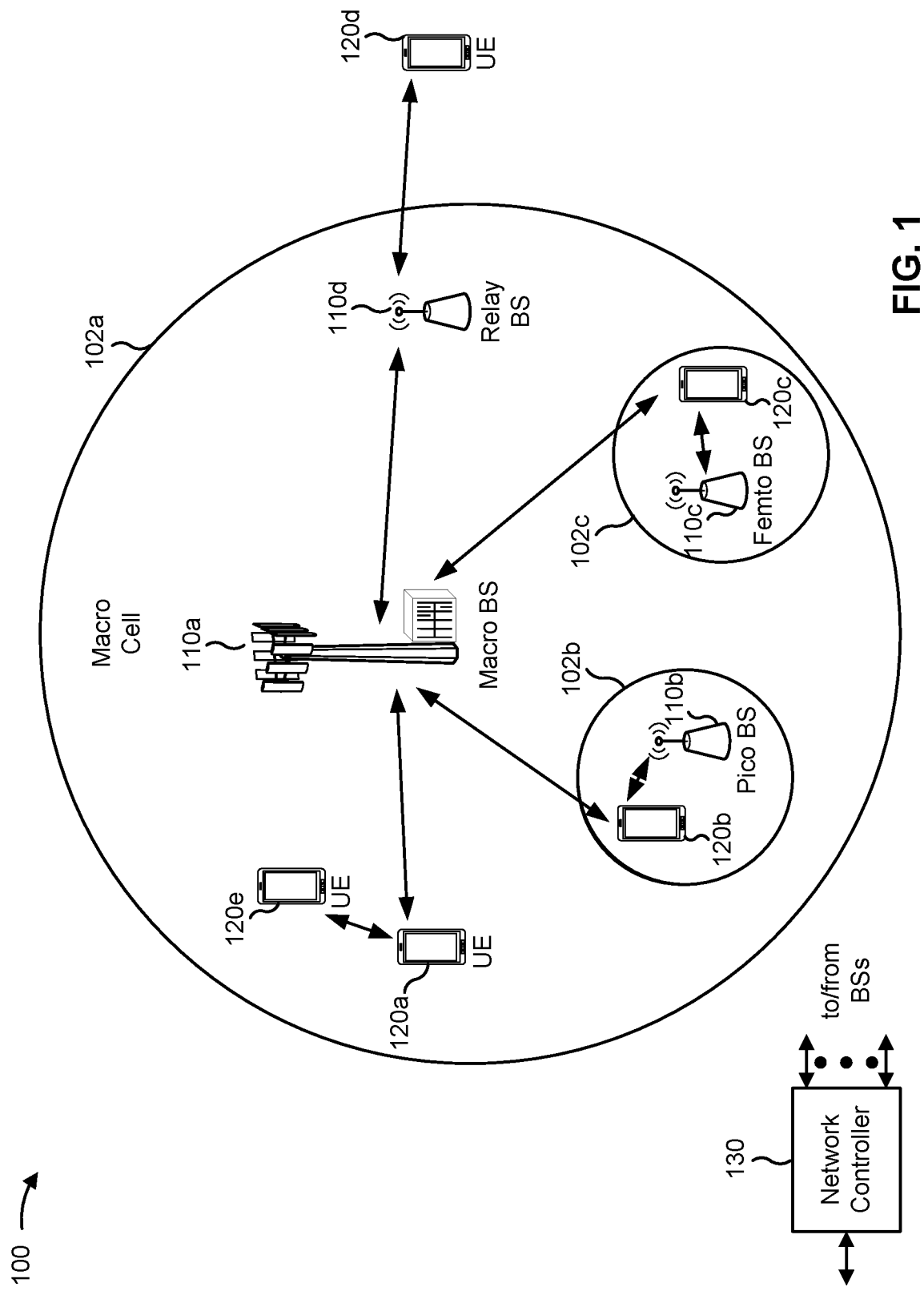
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
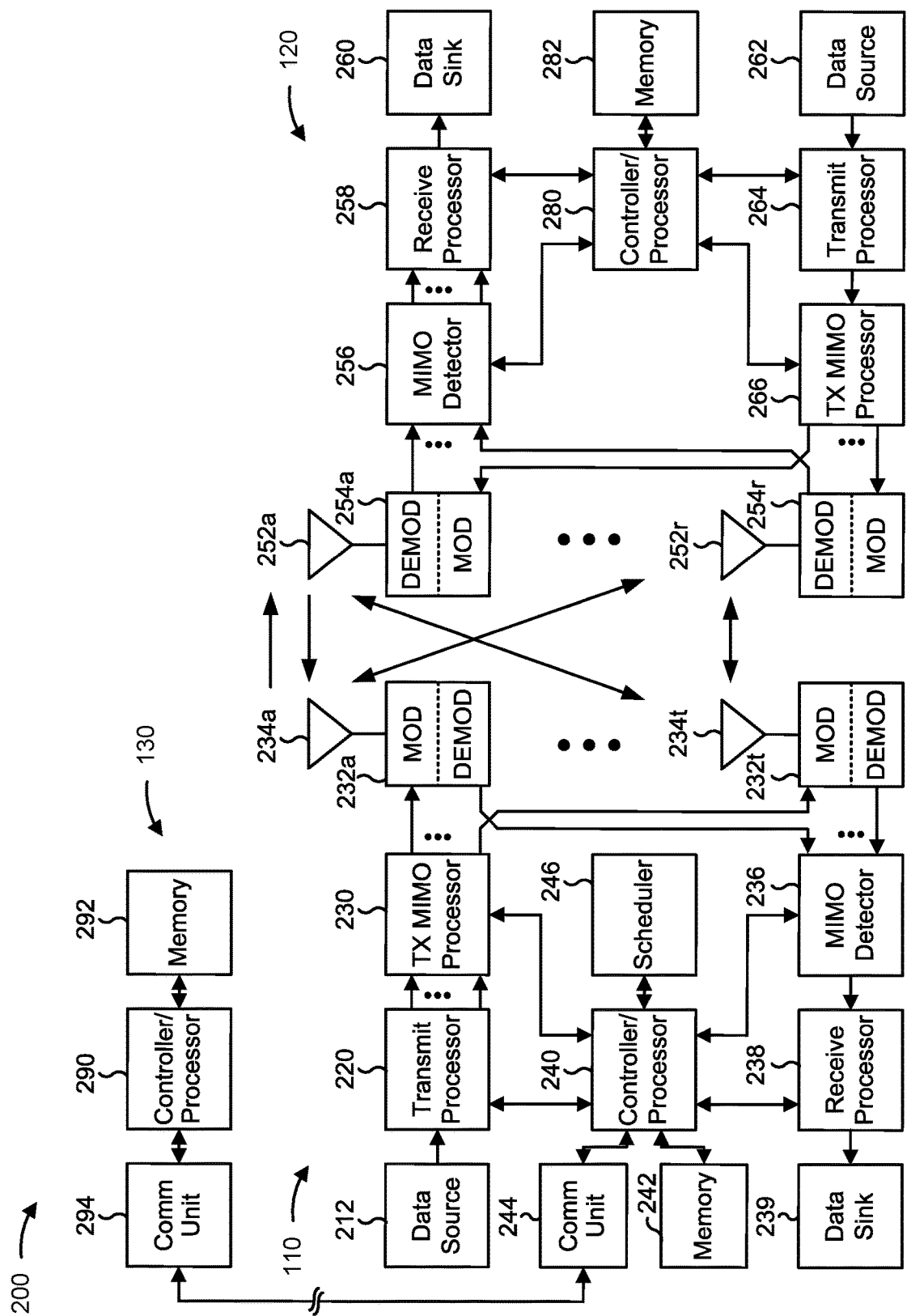
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with precoding sounding reference signals for partial reciprocity, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9 and/or other processes as described herein. A scheduler 246 may schedule UEs for data transmission on the downlink and/or uplink.

In some aspects, UE 120 may include means for determining downlink CSI, means for transmitting a first sounding reference signal (SRS) and a second SRS, wherein the second SRS is precoded based at least in part on the downlink CSI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
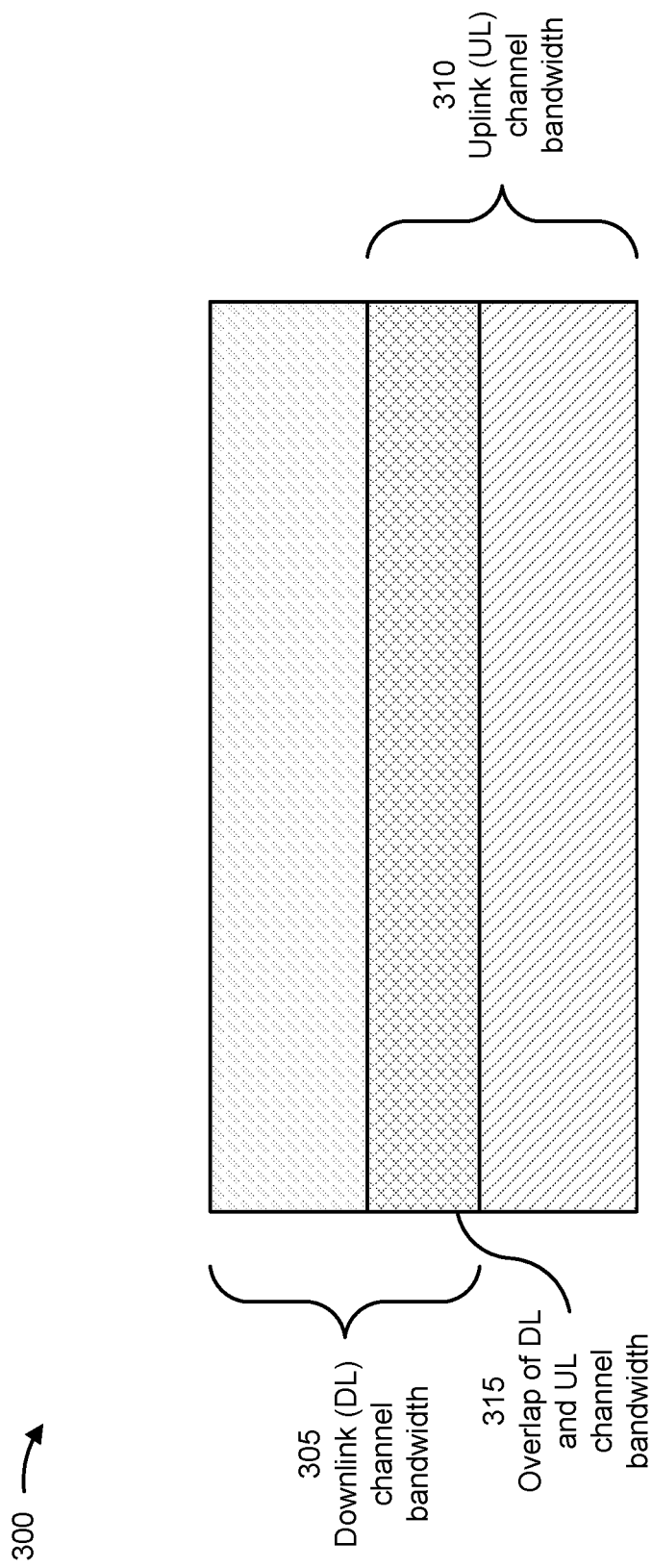
FIG. 3 is a diagram illustrating an example of a DL bandwidth and a UL bandwidth with partial reciprocity in accordance with various aspects of the present disclosure.

FIG. 3 is a diagram illustrating an example of a DL bandwidth and a UL bandwidth with partial reciprocity in accordance with various aspects of the present disclosure.

Reference number 305 shows a DL channel bandwidth and reference number 310 shows a UL channel bandwidth. As shown by reference number 315 a portion of the DL channel bandwidth and a portion of the UL channel bandwidth may overlap. In other words, a portion of the UL channel bandwidth and a portion of the DL channel bandwidth may use a shared bandwidth. The DL channel and the UL channel have partial reciprocity based at least in part on the portion of the DL channel bandwidth and the portion of the UL channel bandwidth overlapping.

In some aspects, all of the UL channel bandwidth may be within a portion of the DL channel bandwidth or all of the DL channel bandwidth may be within a portion of the UL channel bandwidth. In some aspects, if all of the UL channel bandwidth overlaps with all of the DL channel bandwidth, the UL channel and the DL channel have full reciprocity. In other words, full reciprocity occurs when the UL channel and the DL channel have a same bandwidth.

In full reciprocity scenarios, a UE may transmit an SRS to a base station. The base station may use the SRS to determine CSI of the UL channel. Because the UL channel and the DL channel have reciprocity, the base station may estimate DL CSI based at least in part on the CSI of the UL channel.

However, in partial reciprocity scenarios, the base station cannot properly estimate the DL CSI based at least in part on the CSI of the UL channel. Therefore, the base station may transmit a CSI-reference signal (CSI-RS), a physical downlink control channel (PDCCH) trigger, and/or a medium access control control element activation for the UE to transmit a CSI report separately from any SRS transmissions.

As indicated above, FIG. 3 is provided as an example. Other examples may differ from what is described with respect to FIG. 3.

FIG. 4 is a diagram illustrating an example 400 of transmitting a CSI report. As shown, a base station and a UE communicate to provide the base station with information to determine CSI of a DL channel. In some aspects, example 400 may be used in scenarios without full reciprocity between a UL channel and the DL channel. Example 400 may be used in partial reciprocity scenarios.

As shown by reference number 405, the UE may receive a synchronization signal physical broadcast channel block (SSB), a CSI-RS, and or the like from the base station. The SSB, CSI-RS, and/or the like may provide an occasion for the UE to measure a signal from the base station using the DL channel.

As shown by reference number 410, the UE may determine DL CSI for the downlink channel. In some aspects, the UE may determine the DL CSI based at least in part on measuring the SSB or the CSI-RS.

As shown by reference number 415, the UE may receive a PDCCH message to trigger a CSI report. In some aspects, the PDCCH message may include downlink control information (DCI) that may trigger transmission of the CSI report. The DCI may identify a resource (e.g., including one or more resource elements) for transmitting the CSI report via a physical uplink shared channel (PUSCH) or via a physical uplink control channel (PUCCH).

As shown by reference number 420, the UE may transmit a PUSCH message with the CSI report. The base station may use the CSI report to determine the CSI for the DL channel. In some aspects, the UE may be configured to separately transmit SRSs for the base station to separately determine CSI for the UL channel. Based at least in part on transmitting the CSI report separately from the SRSs, computing, communication, and/or network resources may be consumed for the base station to determine CSI for the DL and CSI for the UL separately.

In some aspects described herein, a UE may determine CSI for a DL channel (e.g., based at least in part on measuring an SSB, CSI-RS, and/or the like). The UE may be configured to transmit a pair of SRSs to the base station. A first SRS of the pair of SRSs (e.g., an SRS without information about DL CSI) may be transmitted to the base station. A second SRS of the pair of SRSs may be precoded with information about DL CSI. The BS may be able to determine the DL CSI based at least in part on the pair of SRSs. For example, the base station may decode the second SRS based at least in part on receiving the pair of SRSs and determine the DL CSI. In this way, DL CSI may be transmitted to the network without separately transmitting and scheduling a CSI transmission. This may conserve computing, communication, and/or network resources that may otherwise have been used to schedule and transmit the CSI report via a PUSCH message.

Figure 5A:
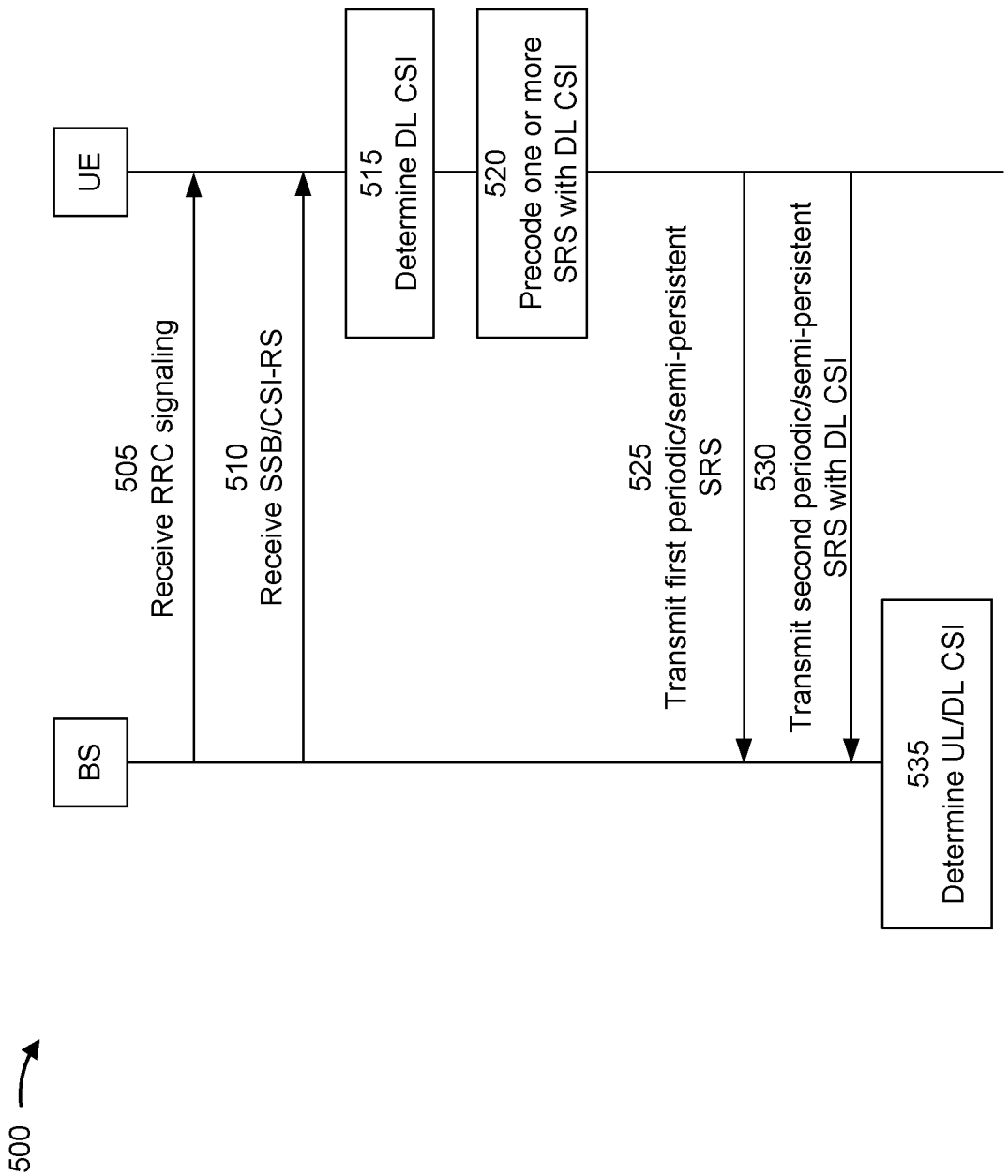
FIGS. 5A and 5B are diagrams illustrating one or more examples of precoding sounding reference signals for partial reciprocity, in accordance with various aspects of the present disclosure.
Figure 5B:
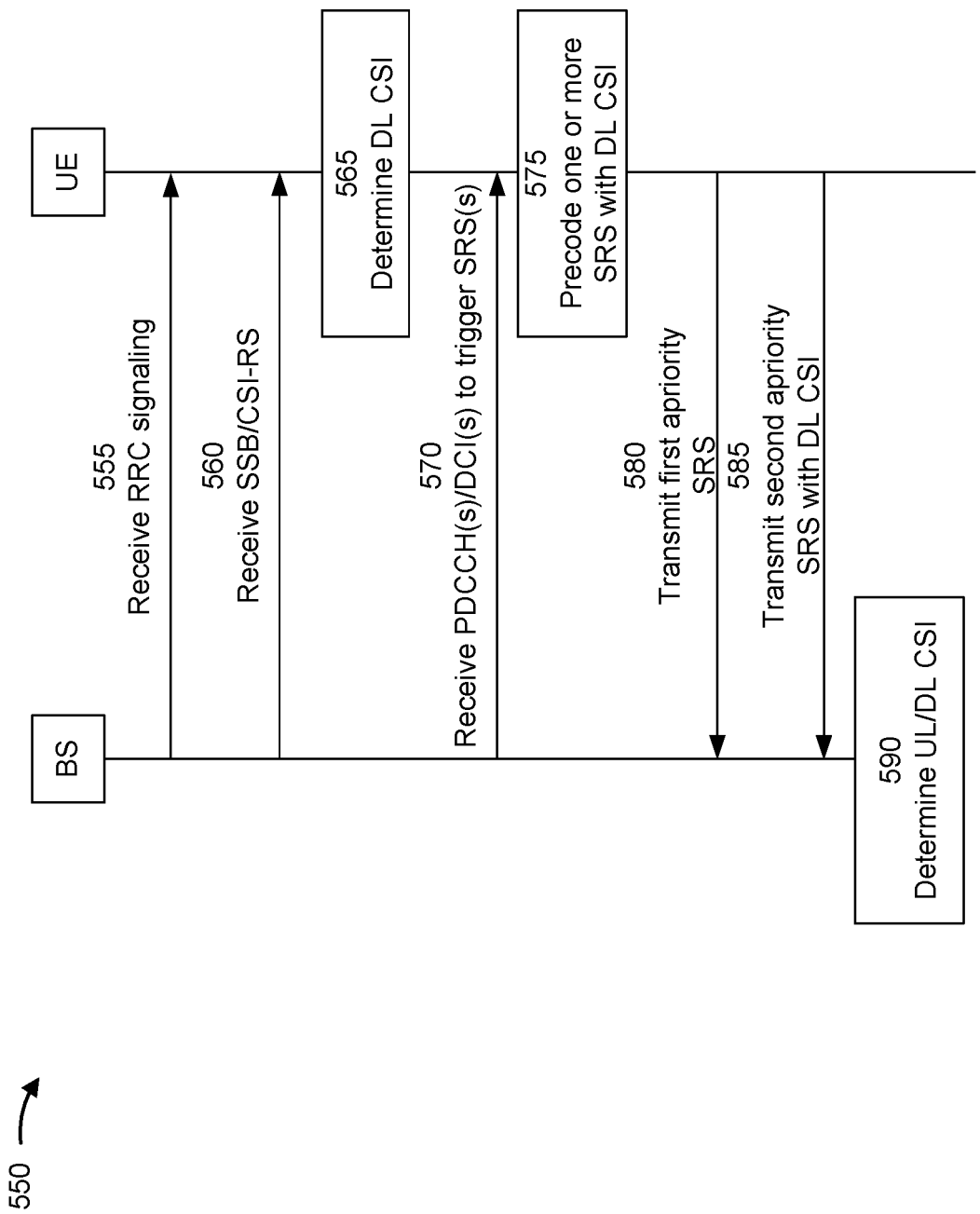

FIGS. 5A and 5B are diagrams illustrating one or more examples 500 and 550 of precoding sounding reference signals for partial reciprocity, in accordance with various aspects of the present disclosure. As shown, a base station (e.g., base station 110) and a UE (e.g., UE 120) communicate to provide the base station with information to determine CSI of a DL channel. In some aspects, the one or more examples may be used in scenarios without full reciprocity between a UL channel and the DL channel. The one or more examples may be used in partial reciprocity scenarios.

As shown in FIG. 5A, and by reference number 505, the UE may receive RRC signaling (e.g., from the base station). In some aspects, the RRC signaling may be used to schedule a resource set (e.g., SRS-Resource Set) for transmitting a first SRS and a second SRS. The resource set may include a first resource for transmission of the first SRS and a second resource for transmission of the second SRS. The first resource and the second resource may be scheduled during a same symbol or different symbols.

In some aspects, the RRC signaling may include an indication of a set of resources for one or more non-zero-power (NZP) CSI-RSs associated with the first SRS and/or the second SRS. In some aspects, the RRC signaling may include an indication of a set of resources for one NZP CSI-RS that is associated with the first SRS and the second SRS. For example, the RRC signaling may be used to configure the UE for transmitting the first SRS and/or the second SRS using a periodic and/or a semi-persistent SRS set of resources. In some aspects, the RRC signaling may include an indication of one or more resource identifiers (e.g., NZP-CSI-RS-ResourceId) to identify one or more resources used for the NZP CSI-RS. For example, the RRC signaling may identify the one or more resource identifiers with a parameter for a CSI-RS associated with a set of resources for transmitting the SRSs (e.g., associatedCSI-RS). In some aspects, an order of SRS resources in the set of resources for transmitting the SRSs corresponds to an order of NZP CSI-RS resources.

In some aspects, the RRC signaling may indicate that the UE is to transmit the first SRS and the second SRS. The RRC signaling (e.g., a CSI report configuration (e.g., CSI-ReportConfig)) may indicate whether, with what information, and/or how to precode the first SRS and/or the second SRS. For example, the RRC signaling may indicate that the UE is to precode the second SRS based at least in part on DL CSI. The RRC signaling may further indicate whether the first SRS and/or the second SRS are to be precoded (e.g., srsPrecoded), a bandwidth for the set of resources for transmitting the SRSs, whether wideband precoding or subband precoding is to be used to precode the first SRS and/or the second SRS (e.g., Precoding-FormatIndicator), a codebook configuration to indicate a precoder to use for precoding the first SRS and/or the second SRS (e.g., code-bookConfig), a subband size to indicate a size of the subband if subband precoding is indicated (e.g., subbandSize), and/or the like.

In some aspects, first RRC signaling (e.g., a first portion of RRC signaling, a first instance of RRC signaling, and/or the like) may be used to configure the first SRS, and second RRC signaling (e.g., a second portion of RRC signaling, a second instance of RRC signaling, and/or the like) may be used to configure the second SRS. In some aspects, the first RRC signaling and the second RRC signaling may be received separately. In some aspects, the first RRC signaling may configure transmission, activation or triggering, and/or the like for the first SRS separately from the second RRC signaling that may configure transmission, activation triggering, and/or the like for the second SRS. The first RRC signaling and/or the second RRC signaling may indicate that the UE is to transmit the first SRS separately from the second SRS (e.g., using a different set of resources). In some aspects, the RRC signaling may configure the UE for SRS switching where the UE transmits the first SRS without precoding or with different precoding than the second SRS, and transmits the second SRS with precoding.

In some aspects, the UE may receive third RRC signaling and/or first DCI to trigger the first SRS. The UE may also receive fourth RRC signaling and/or second DCI to trigger the second SRS. In some aspects, the third RRC signaling and/or the fourth RRC signaling may indicate periodic or semi-persistent scheduling of one or more resource sets for transmitting the first SRS and/or the second SRS. In some aspects, the third RRC signaling and/or the first DCI may indicate that the UE is to transmit the first SRS without precoding based at least in part on DL CSI (e.g., without an indication of srsPrecoded). In some aspects, the fourth RRC signaling and/or the second DCI may indicate that the UE is to transmit the second SRS with precoding based at least in part on DL CSI (e.g., with an indication of srsPrecoded).

As shown by reference number 510, the UE may receive an SSB and/or a CSI-RS (e.g., from the base station). The SSB and/or the CSI-RS may provide an occasion for the UE to measure a signal from the base station using the DL channel. The DL CSI may be based at least in part on a measurement (e.g., by the UE) of the CSI-RS (e.g., an NZP CSI-RS). In some aspects, a single SSB and/or a single CSI-RS may be associated with the first SRS and the second SRS.

In some aspects, the UE may be configured to transmit the first SRS and the second SRS based at least in part on the single SSB and/or the single CSI-RS. For example, the UE may be configured to transmit the first SRS and/or the second SRS based at least in part on the RRC signaling, with a CSI-RS index configured by the RRC signaling. In some aspects, the first SRS and/or the second SRS may be activated based at least in part on a media access control (MAC) control element (CE), and/or the first SRS and/or the second SRS may be triggered by DCI.

As shown by reference number 515, the UE may determine DL CSI. In some aspects, the DL CSI may include indications of reference signal received power (RSRP), received signal strength indicator (RSSI), reference signal received quality (RSRQ), channel quality indicator (CQI), and/or the like.

As shown in reference number 520, the UE may precode one or more SRSs (e.g., the first SRS and/or the second SRS) with DL CSI. In other words, the UE may precode the second SRS based at least in part on the DL CSI. The UE may calculate a precoder for precoding the second SRS based at least in part on a measurement of the SSB, CSI-RS, and/or the like that is associated with the second SRS.

In some aspects, the UE may precode the first SRS based at least in part on a precoding matrix. The UE may precode the second SRS based at least in part on the precoding matrix and the DL CSI. In some aspects, the precoding matrix may be independent from the DL CSI. In some aspects, the precoding matrix may be based at least in part on a configuration of the UE.

To precode the second SRS with the DL CSI, the UE may perform an initial step of a precoding process to determine an intermediate quantity based at least in part on Function 1:

Function 1

$$\tilde{a}^{(p_i)}_{K_{TC}k'+k_0^{(p_i)}, l'+l_0} = \begin{cases} \frac{1}{\sqrt{N_{ap}}} r^{(p_i)}(k', l') & k' = 0, 1, \ldots, M_{sc,b}^{SRS} - 1 \ \ l' = 0, 1, \ldots, N_{symb}^{SRS} - 1 \\ 0 & \text{otherwise} \end{cases};$$

In Function 1, $r^{(p_i)}(k',l')$ is a low peak-to-average power ratio sequence, $N_{ap}$ is a number of antenna ports of the UE, $M_{sc,b}^{SRS}$ is a length of the sounding reference signal sequence, $N_{symb}^{SRS}$ is consecutive OFDM symbols, $K_{TC}$ is a transmission comb number, $k_0^{(p_i)}$ is a frequency-domain starting position, $l_0$ is a starting position in the time domain.

The intermediate quantity may be precoded, multiplied with an amplitude scaling factor $\beta_{SRS}$ to satisfy transmit power requirements, and/or be mapped to physical resources according to Function 2:

$$\begin{bmatrix} a^{(p_0)}_{K_{TC}k'+k_0^{(p_i)}, l'+l_0} \\ a^{(p_1)}_{K_{TC}k'+k_0^{(p_i)}, l'+l_0} \\ \vdots \\ a^{(p_{N_{ap}^{SRS}-1})}_{K_{TC}k'+k_0^{(p_i)}, l'+l_0} \end{bmatrix} = \beta_{SRS} W \begin{bmatrix} \tilde{a}^{(p_0)}_{K_{TC}k'+k_0^{(p_i)}, l'+l_0} \\ \tilde{a}^{(p_1)}_{K_{TC}k'+k_0^{(p_i)}, l'+l_0} \\ \vdots \\ \tilde{a}^{(p_{N_{ap}^{SRS}-1})}_{K_{TC}k'+k_0^{(p_i)}, l'+l_0} \end{bmatrix} \quad \text{Function 2}$$

As shown by reference number 525, the UE may transmit a first SRS (e.g., a first periodic or semi-persistent SRS). In some aspects, the SRS may be a non-precoded SRS or may be precoded with a different precoder than a precoder for the second SRS.

As shown by reference number 530, the UE may transmit a second SRS (e.g., a second periodic or semi-persistent SRS) that is precoded based at least in part on the DL CSI. In some aspects, a periodicity of the first SRS may be different from a periodicity of the second SRS.

In some aspects, the first SRS and/or the second SRS may be triggered or activated based at least in part on receiving RRC signaling, a MAC-CE, DCI, and/or the like to activate or trigger the first SRS. In some aspects, the first SRS may be triggered or activated separately from triggering or activation of the second SRS.

Although described with reference to a first SRS and a second SRS, additional SRSs may be used in the scope of this description. For example, the UE may transmit the first SRS, the second SRS, a third SRS and a fourth SRS. In some aspects, one or more of the third SRS or the fourth SRS may be precoded based at least in part on the DL CSI.

In some aspects, the UE may transmit all four SRSs during a same resource set. In some aspects, the UE may transmit the first SRS, the second SRS, the third SRS, and the fourth SRS via a single SRS port (e.g., based at least in part on the UE being configured as a 1 transmitter 2 receiver UE). In some aspects, the UE may transmit the first SRS and the second SRS via a first SRS port and may transmit the third SRS and the fourth SRS via a second SRS port (e.g., based at least in part on the UE being configured as a 2 transmitter 4 receiver UE).

As shown by reference number 535, the base station may determine UL CSI and DL CSI based at least in part on the first SRS and the second SRS. For example, the base station may use the first SRS to determine the UL CSI and may compare the first SRS and the second SRS to determine the DL CSI that is precoded into the second SRS. In this way, computing, communication, and/or network resources may be conserved that may otherwise be used to schedule and transmit a CSI report independently from the SRSs.

As indicated above, FIG. 5A is provided as an example. Other examples may differ from what is described with respect to FIG. 5A.

As shown in FIG. 5B, and by reference number 555, a UE may receive RRC signaling from a base station. The RRC signaling may have one or more attributes as described relative to the RRC signaling described in connection with reference number 505. The RRC signaling may provide configuration information for the UE.

As shown by reference number 560, the UE may receive an SSB and/or a CSI-RS (e.g., from the base station). The SSB and/or the CSI-RS may have one or more attributes as described relative to the SSB and/or the CSI-RS described in connection with reference number 510. As described in connection with reference number 510, the SSB and/or the CSI-RS may provide an occasion for the UE to measure a signal from the base station using the DL channel.

As shown by reference number 565, the UE may determine DL CSI. In some aspects, the DL CSI may include indications of RSRP, RSSI, RSRQ, CQI, and/or the like.

As shown by reference number 570, the UE may receive one or more PDCCH messages and/or one or more DCI messages to trigger the first SRS and/or the second SRS. In some aspects, the UE may receive DCI associated with the first SRS and/or the second SRS to identify one or more resources associated with one or more NZP CSI-RSs and/or to indicate one or more resources for transmitting the first SRS and the second SRS.

In some aspects, the one or more PDCCH messages and/or the one or more DCI messages may indicate that the first SRS is associated with a first resource set and is configured without precoding or with different precoding than precoding for the second SRS. In some aspects, the one or more PDCCH messages and/or the one or more DCI messages may indicate that the second SRS is associated with a second resource set and/or is configured with precoding (e.g., associated with the DL CSI).

As shown by reference number 575, the UE may precode one or more SRSs (e.g., the second SRS) with DL CSI. In some aspects, the UE may precode the one or more SRSs in a manner described herein (e.g., as described relative to reference number 520).

As shown by reference number 580, the UE may transmit a first SRS (e.g., a first apriority SRS). In some aspects, the first SRS may be a non-precoded SRS or may be precoded with a different precoder than a precoder for the second SRS.

As shown by reference number 585, the UE may transmit a second SRS (e.g., a second apriority SRS) that is precoded based at least in part on the DL CSI. In some aspects, a periodicity of the first SRS may be different from a periodicity of the second SRS.

In some aspects, the first SRS and/or the second SRS may be triggered or activated based at least in part on receiving RRC signaling, a MAC-CE, DCI, and/or the like to activate or trigger the first SRS. In some aspects, the first SRS may be triggered or activated separately from triggering or activation of the second SRS.

Although described with reference to a first SRS and a second SRS, additional SRSs may be used in the scope of this description. For example, the UE may transmit the first SRS, the second SRS, a third SRS and a fourth SRS. In some aspects, one of the third SRS or the fourth SRS may be precoded based at least in part on the DL CSI.

In some aspects, the UE may transmit all four SRSs during a same resource set. In some aspects, the UE may transmit the first SRS, the second SRS, the third SRS, and the fourth SRS via a single SRS port (e.g., based at least in part on the UE being configured as a 1 transmitter 2 receiver UE). In some aspects, the UE may transmit the first SRS and the second SRS via a first SRS port and may transmit the third SRS and the fourth SRS via a second SRS port (e.g., based at least in part on the UE being configured as a 2 transmitter 4 receiver UE).

As indicated above, FIG. 5B is provided as an example. Other examples may differ from what is described with respect to FIG. 5B.

FIG. 6 is a diagram illustrating an example 600 of RRC signaling, in accordance with various aspects of the present disclosure. As shown, the RRC signaling may include an indication of a set of resources for one or more SRSs (e.g., SRS-ResourceSet) that may include a field to indicate whether the UE is to use precoding for an associated SRS (e.g., precoding based at least in part on the DL CSI). As shown, an indication of "precoding" may be added to the "ENUMERATED" field (e.g., shown as a last indication of the "ENUMERATED" field).

As indicated above, FIG. 6 is provided as an example. Other examples may differ from what is described with respect to FIG. 6.

FIG. 7 is a diagram illustrating an example 700 of RRC signaling, in accordance with various aspects of the present disclosure. As shown, the RRC signaling may include an indication of a configuration of a precoder. In some aspects, a configuration of the precoder may be based at least in part on RRC signaling indicating a configuration of a CSI report (e.g., CSI-ReportConfig). The configuration may include one or more of an indication of whether the SRS is precoded (e.g., srsPrecoded), an indication of whether a wideband or subband precoder is to be used for precoding (e.g., Precoding-FormatIndicator), an indication of a corresponding precoder to be used for the SRS (e.g., codebookConfig), an indication of a size of a subband if a subband precoder is used (e.g., subbandSize), and/or the like.

As indicated above, FIG. 7 is provided as an example. Other examples may differ from what is described with respect to FIG. 7.

FIG. 8 is a diagram illustrating an example 800 of RRC signaling, in accordance with various aspects of the present disclosure. The RRC signaling shown may be used to configure a set of SRSs. As shown, the RRC signaling may include an indication of a configuration of a precoder. In some aspects, a configuration of the precoder may be based at least in part on RRC signaling indicating a configuration of a CSI report (e.g., CSI-ReportConfig). The configuration may include one or more of an indication of whether the SRSs in the set are precoded (e.g., srsPrecoded), an indication of whether a wideband or subband precoder is to be used for precoding (e.g., Precoding-FormatIndicator), an indication of a corresponding precoder to be used for the set of SRSs in the set (e.g., codebookConfig), an indication of a size of a subband if a subband precoder is used (e.g., subbandSize), and/or the like.

As indicated above, FIG. 8 is provided as an example. Other examples may differ from what is described with respect to FIG. 8.

Figure 9:
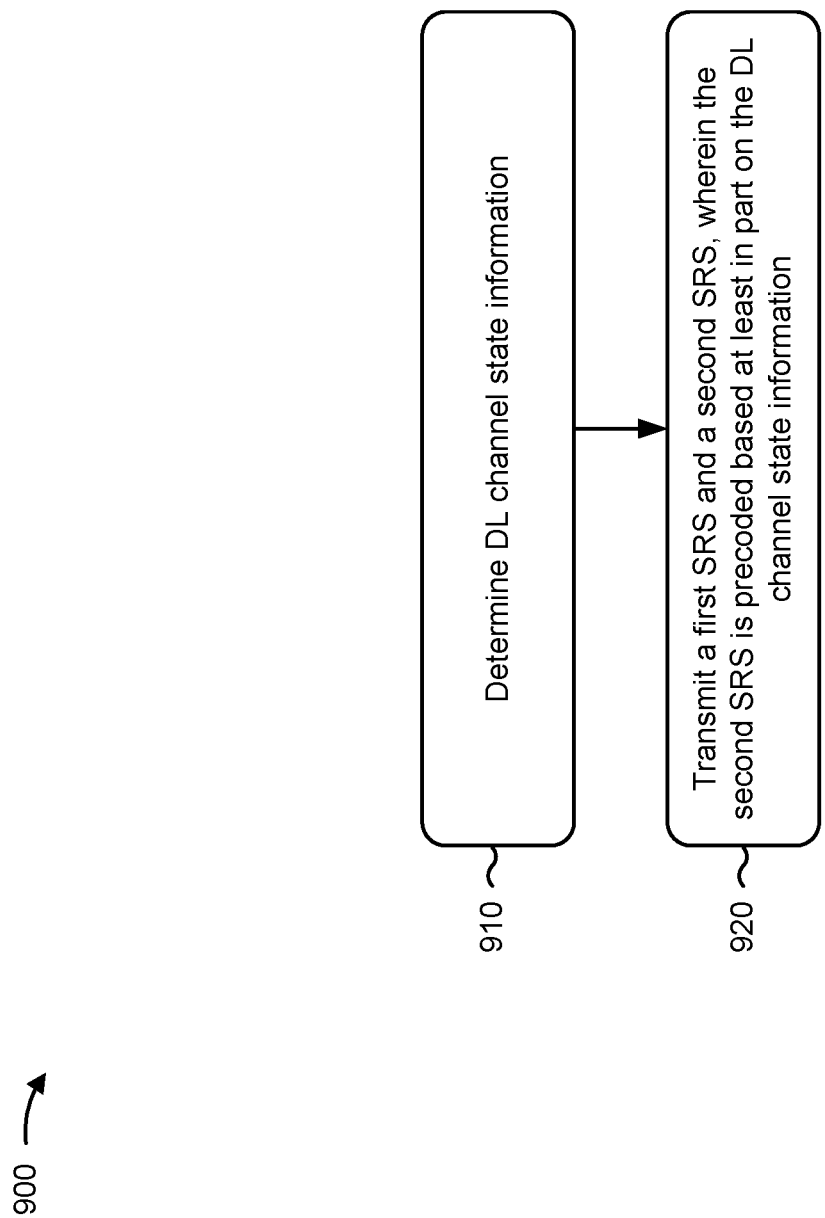
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with precoding sounding reference signals for partial reciprocity precoded sounding reference signals for partial reciprocity.

As shown in FIG. 9, in some aspects, process 900 may include determining DL CSI (block 910). For example, the UE (e.g., using controller/processor 280 and/or the like) may determine DL CSI, as described above.

As further shown in FIG. 9, in some aspects, process 900 may include transmitting a first SRS and a second SRS, wherein the second SRS is precoded based at least in part on the DL CSI (block 920). For example, the UE (e.g., using controller/processor 280, transmit processor 264, TX MIMO processor 266, MOD 254, antenna 252, and/or the like) may transmit a first SRS and a second SRS, as described above. In some aspects, the second SRS is precoded based at least in part on the DL CSI.

Process 900 may include additional aspects, such as any single aspect or any combination of aspects described below and/or in connection with one or more other processes described elsewhere herein.

In a first aspect, transmitting the first SRS and the second SRS comprises transmitting the first SRS and the second SRS based at least in part on a single DL CSI reference signal.

In a second aspect, alone or in combination with the first aspect, process 900 includes receiving radio resource control signaling to schedule a resource set including a first resource for transmission of the first SRS and a second resource for transmission of the second SRS.

In a third aspect, alone or in combination with one or more of the first and second aspects, process 900 includes determining a measurement of an NZP CSI-RS associated with the second SRS, and calculating a precoder for precoding the second SRS based at least in part on the measurement of the NZP CSI-RS associated with the second SRS.

In a fourth aspect, alone or in combination with one or more of the first through third aspects, the radio resource control signaling further includes an indication of a set of resources for one or more NZP CSI-RSs associated with one or more of the first SRS or the second SRS.

In a fifth aspect, alone or in combination with one or more of the first through fourth aspects, process 900 includes receiving DCI associated with one or more of the first SRS and the second SRS, wherein the DCI identifies one or more resources associated with one or more NZP CSI-RSs, and wherein the DCI indicates one or more resources for transmitting the first SRS and the second SRS.

In a sixth aspect, alone or in combination with one or more of the first through fifth aspects, process 900 includes receiving RRC signaling indicating that the UE is to transmit the first SRS and the second SRS with the second SRS precoded based at least in part on the DL CSI.

In a seventh aspect, alone or in combination with one or more of the first through sixth aspects, the first SRS is a non-precoded SRS.

In an eighth aspect, alone or in combination with one or more of the first through seventh aspects, process 900 includes receiving RRC signaling to indicate one or more of: whether the first SRS is to be precoded, whether wideband precoding or subband precoding is to be used to precode one or more of the first SRS or the second SRS, a codebook configuration to indicate a precoder to use for precoding at least one of the first SRS or the second SRS, or a subband size for using the subband precoding.

In a ninth aspect, alone or in combination with one or more of the first through eighth aspects, the first SRS has a first periodicity that is different from a second periodicity of the second SRS.

In a tenth aspect, alone or in combination with one or more of the first through ninth aspects, an uplink channel associated with the first SRS and the second SRS has partial reciprocity with a DL channel associated with the DL CSI.

In an eleventh aspect, alone or in combination with one or more of the first through tenth aspects, the first SRS is precoded based at least in part on a precoding matrix and the second SRS is precoded based at least in part on the precoding matrix and the DL CSI.

In a twelfth aspect, alone or in combination with one or more of the first through eleventh aspects, the precoding matrix is independent from the DL CSI.

In a thirteenth aspect, alone or in combination with one or more of the first through twelfth aspects, the first SRS and the second SRS are associated with a single NZP CSI-RS and the DL CSI is based at least in part on a measurement of the NZP CSI-RS.

In a fourteenth aspect, alone or in combination with one or more of the first through thirteenth aspects, process 900 includes transmitting the first SRS, the second SRS, a third SRS, and a fourth SRS during different symbols of a same resource set.

In a fifteenth aspect, alone or in combination with one or more of the first through fourteenth aspects, transmitting the first SRS, the second SRS, the third SRS, and the fourth SRS comprises transmitting the first SRS, the second SRS, the third SRS, and the fourth SRS via a single SRS port.

In a sixteenth aspect, alone or in combination with one or more of the first through fifteenth aspects, the fourth SRS is precoded based at least in part on the DL CSI.

In a seventeenth aspect, alone or in combination with one or more of the first through sixteenth aspects, transmitting the first SRS, the second SRS, the third SRS, and the fourth SRS comprises: transmitting the first SRS and the second SRS via a first SRS port, and transmitting the third SRS and the fourth SRS via a second SRS port.

In an eighteenth aspect, alone or in combination with one or more of the first through seventeenth aspects, process 900 includes receiving first RRC signaling to configure the first SRS, and receiving second RRC signaling to configure the second SRS.

In a nineteenth aspect, alone or in combination with one or more of the first through eighteenth aspects, transmitting the first SRS and the second SRS comprises transmitting the first SRS separately from the second SRS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining downlink (DL) channel state information for a DL channel; and
   transmitting a first sounding reference signal (SRS) and a second SRS, associated with an uplink (UL) channel, wherein the second SRS is precoded based at least in part on (i) the DL channel state information and (ii) an occurrence of a partial reciprocity scenario between the DL channel and the UL channel.

2. The method of claim 1, wherein transmitting the first SRS and the second SRS comprises:
   transmitting the first SRS and the second SRS based at least in part on a single DL channel state information reference signal.

3. The method of claim 1, further comprising:
   receiving radio resource control signaling to schedule a resource set including a first resource for transmission of the first SRS and a second resource for transmission of the second SRS.

4. The method of claim 3, further comprising:
   determining a measurement of a non-zero-power channel state information reference signal (NZP CSI-RS) associated with the second SRS; and
   calculating a precoder for precoding the second SRS based at least in part on the measurement of the NZP CSI-RS associated with the second SRS.

5. The method of claim 3, wherein the radio resource control signaling further includes an indication of a set of resources for one or more non-zero-power channel state information reference signals associated with one or more of the first SRS or the second SRS.

6. The method of claim 1, further comprising:
   receiving downlink channel information (DCI) associated with one or more of the first SRS and the second SRS, wherein the DCI identifies one or more resources associated with one or more non-zero-power channel state information reference signals, and
   wherein the DCI indicates one or more resources for transmitting the first SRS and the second SRS.

7. The method of claim 1, further comprising:
   receiving radio resource control signaling indicating that the UE is to transmit the first SRS and the second SRS with the second SRS precoded based at least in part on the DL channel state information.

8. The method of claim 1, wherein the first SRS is a non-precoded SRS.

9. The method of claim 1, further comprising:
   receiving radio resource control signaling to indicate one or more of:
   whether the first SRS is to be precoded,
   whether wideband precoding or subband precoding is to be used to precode one or more of the first SRS or the second SRS,
   a codebook configuration to indicate a precoder to use for precoding at least one of the first SRS or the second SRS, or
   a subband size for using the subband precoding.

10. The method of claim 1, wherein the first SRS has a first periodicity that is different from a second periodicity of the second SRS.

11. The method of claim 1, wherein the first SRS is precoded based at least in part on a precoding matrix, and wherein the second SRS is precoded based at least in part on the precoding matrix and the DL channel state information.

12. The method of claim 11, wherein the precoding matrix is independent from the DL channel state information.

13. The method of claim 11, wherein the first SRS and the second SRS are associated with a single non-zero-power channel state information reference signal (NZP CSI-RS), and
   wherein the DL channel state information is based at least in part on a measurement of the single NZP CSI-RS.

14. The method of claim 1, further comprising:
   transmitting the first SRS, the second SRS, a third SRS, and a fourth SRS during different symbols of a same resource set.

15. The method of claim 14, wherein transmitting the first SRS, the second SRS, the third SRS, and the fourth SRS comprises:
   transmitting the first SRS, the second SRS, the third SRS, and the fourth SRS via a single SRS port.

16. The method of claim 14, wherein the fourth SRS is precoded based at least in part on the DL channel state information.

17. The method of claim 14, wherein transmitting the first SRS, the second SRS, the third SRS, and the fourth SRS comprises:
   transmitting the first SRS and the second SRS via a first SRS port, and
   transmitting the third SRS and the fourth SRS via a second SRS port.

18. The method of claim 1, further comprising:
   receiving first radio resource control signaling to configure the first SRS; and
   receiving second radio resource control signaling to configure the second SRS.

19. The method of claim 18, wherein transmitting the first SRS and the second SRS comprises:
   transmitting the first SRS separately from the second SRS.

20. The method of claim 18, further comprising:
   receiving one or more of the first radio resource control signaling, a first media access control control element (MAC-CE), or first downlink control information to activate or trigger the first SRS; and
   receiving one or more of the second radio resource control signaling, a second MAC-CE or second downlink control information to activate or trigger the second SRS.

21. The method of claim 18, wherein the first radio resource control signaling indicates that the first SRS is associated with a first resource set and is configured without precoding or with different precoding than precoding for the second SRS, and
   wherein the second radio resource control signaling indicates that the second SRS is associated with a second resource set and is configured with precoding.

22. A user equipment (UE) for wireless communication, comprising:
   a memory; and
   one or more processors operatively coupled to the memory, the memory and the one or more processors configured to:
   determine downlink (DL) channel state information for a DL channel; and
   transmit a first sounding reference signal (SRS) and a second SRS, associated with an uplink (UL) channel, wherein the second SRS is precoded based at least in part on (i) the DL channel state information and (ii) an occurrence of a partial reciprocity scenario between the DL channel and the UL channel.

23. A non-transitory computer-readable medium storing one or more instructions for wireless communication, the one or more instructions comprising:
> one or more instructions that, when executed by one or more processors of a user equipment (UE), cause the one or more processors to:
> > determine downlink (DL) channel state information for a DL channel; and
> > transmit a first sounding reference signal (SRS) and a second SRS, associated with an uplink (UL) channel, wherein the second SRS is precoded based at least in part on (i) the DL channel state information and (ii) an occurrence of a partial reciprocity scenario between the DL channel and the UL channel.

24. An apparatus for wireless communication, comprising:
> means for determining downlink (DL) channel state information for a DL channel; and
> means for transmitting a first sounding reference signal (SRS) and a second SRS, associated with an uplink (UL) channel, wherein the second SRS is precoded based at least in part on (i) the DL channel state information and (ii) an occurrence of a partial reciprocity scenario between the DL channel and the UL channel.

25. The method of claim 1, wherein the DL channel state information is based at least in part on a measurement of a non-zero-power channel state information reference signal (NZP CSI-RS).

* * * * *